United States Patent [19]

Erdelsky

[11] 4,428,560

[45] Jan. 31, 1984

[54] OUTLET COUPLING MEMBER FOR A PROPELLANT STORAGE CONSTRUCTION AND METHOD OF MAKING THE SAME

[75] Inventor: Joseph J. Erdelsky, Jeannette, Pa.

[73] Assignee: Robertshaw Controls Company, Richmond, Va.

[21] Appl. No.: 326,529

[22] Filed: Dec. 2, 1981

[51] Int. Cl.³ .............................................. F16L 37/28
[52] U.S. Cl. .............................. 251/149.1; 251/149.5; 137/231; 285/376
[58] Field of Search ...................... 137/231; 251/149.6, 251/149.5, 149.1; 285/376, 360, 361, 401, 402, 396; 222/399, 527

[56] References Cited

U.S. PATENT DOCUMENTS

| | | | |
|---|---|---|---|
| 2,044,252 | 6/1936 | Mitchell et al. | 251/149.5 |
| 2,149,681 | 3/1939 | Johnston | 137/231 |
| 2,823,699 | 2/1958 | Willis | 285/376 |
| 3,245,423 | 4/1966 | Hansen et al. | 251/149.6 |
| 3,561,726 | 2/1971 | Iannelli | 251/149.6 |
| 3,762,431 | 10/1973 | Wilson et al. | 137/116.3 |

*Primary Examiner*—A. Michael Chambers
*Attorney, Agent, or Firm*—Candor, Candor & Tassone

[57] ABSTRACT

The combination of a propellant storage construction and an outlet coupling member detachably interconnected to an outlet of the construction for dispensing propellant from the construction, the outlet comprising a locking surface and an outlet passage in the construction and having a valve unit therein that requires a plunger thereof to be axially moved inwardly in the unit to open the unit so that propellant can be dispensed through the outlet passage to the outlet coupling member when the outlet coupling member is disposed in the outlet passage and engages and holds the plunger in its inward position while interlocking with the locking surface. The outlet passage has a substantially cylindrical section and a frusto-conical mouth-like section intermediate the cylindrical section and the locking surface, the outlet coupling member having a substantially flat end surface spanning the outlet passage and engaging the plunger and the end surface having an opening therein disposed outboard of the plunger for receiving the propellant that passes through the open valve unit. The outlet coupling member has a substantially cylindrical body portion provided with opposed ends and an annular groove intermediate the opposed ends thereof. One of the opposed ends of the body portion defines the end surface thereof. The body portion carries an annular sealing ring in the annular groove thereof that seals with the outlet passage outboard of the valve unit.

8 Claims, 6 Drawing Figures

OUTLET COUPLING MEMBER FOR A PROPELLANT STORAGE CONSTRUCTION AND METHOD OF MAKING THE SAME

BACKGROUND OF THE INVENTION

1. Field of the Invention

This invention relates to an improved outlet coupling member in combination with a propellant storage construction as well as to the outlet coupling member per se and the method of making the same.

2. Prior Art Statement

It is known from the U.S. patent to Wilson et al, U.S. Pat. No. 3,762,431 to provide the combination of a propellant storage construction and an outlet coupling member detachably interconnected to an outlet means of the construction for dispensing propellant from the construction, the outlet means comprising an outlet passage in the construction and having a valve unit therein that requires the plunger thereof to be axially moved inwardly in the unit to open the unit so that the propellant can be dispensed through the outlet passage to the outlet coupling member when the outlet coupling member is disposed in the outlet passage and engages and holds the plunger in its inward position.

For example, see FIG. 3 of the aforementioned U.S. Pat. No. 3,762,431 and FIG. 1 of the drawings of this application wherein a needle-like member of the outlet coupling member engages the plunger of the valve unit to open the same.

Also see the U.S. patent to Iannelli, U.S. Pat. No. 3,561,726 which has an outlet coupling member provided with a substantially flat end surface means spanning the outlet passage and engaging a plunger of a valve unit in a passage of a container.

SUMMARY OF THE INVENTION

It is one feature of this invention to provide an improved outlet coupling member for detachably interconnecting to an outlet means of a propellant storage construction.

In particular, it was found that when utilizing the prior known outlet coupling member, which has a needle-like projection for engaging against the plunger of the valve unit in the outlet passage of the propellant storage construction, a misalignment between such needle-like member and plunger caused the needle-like member to slip off of the end of the plunger so that dispensing of propellant could not take place until a readjustment was made in the insertion of the prior known outlet coupling member into the outlet passage of the propellant storage construction.

However, it was found according to the teachings of this invention that an improved outlet coupling member could be provided that would have a relatively large and flat end surface to engage against the plunger of the valve unit so that misalignment and slipping therebetween cannot take place.

For example, one embodiment of this invention provides a combination of a propellant storage construction and an outlet coupling member detachably interconnected to an outlet means of the construction for dispensing propellant from the construction, the outlet means comprising a locking surface means and an outlet passage in the construction and having a valve unit therein that requires a plunger thereof to be axially moved inwardly in the unit to open the unit so the propellant can be dispensed through the outlet passage to the outlet coupling member when the outlet coupling member is disposed in the outlet passage and engages and holds the plunger in its inward position while having interlocking means thereof interlocked with the locking surface means. The outlet passage has a substantially cylindrical section and a frusto-conical mouth-like section intermediate the cylindrical section and the locking surface means. The outlet coupling member has a substantially flat end surface means spanning the outlet passage and engaging the plunger, the end surface means having opening means therein disposed outboard of the plunger for receiving the propellant that passes through the open valve unit. The outlet coupling member has a substantially cylindrical body portion provided with opposed ends and an annular groove intermediate the opposed ends thereof. One of the opposed ends of the body portion defines the end surface means thereof. The body portion carries an annular sealing ring in the annular groove thereof that seals with the outlet passage outboard of the valve unit.

Accordingly, it is an object of this invention to provide an improved combination of a propellant storage construction and an outlet coupling member detachably interconnected to an outlet means of the construction, the combination of this invention having one or more of the novel features of this invention as set forth above or hereinafter shown or described.

Another object of this invention is to provide an improved outlet coupling member for a propellant storage construction or the like, the outlet coupling member of this invention having one or more of the novel features of this invention as set forth above or hereinafter shown or described.

Another object of this invention is to provide an improved method of making such an outlet coupling member, the method of this invention having one or more of the novel features of this invention as set forth above or hereinafter shown or described.

Other objects, uses and advantages of this invention are apparent from a reading of this description which proceeds with reference to the accompanying drawings wherein:

DESCRIPTION OF THE PREFERRED EMBODIMENT

Figure 1:
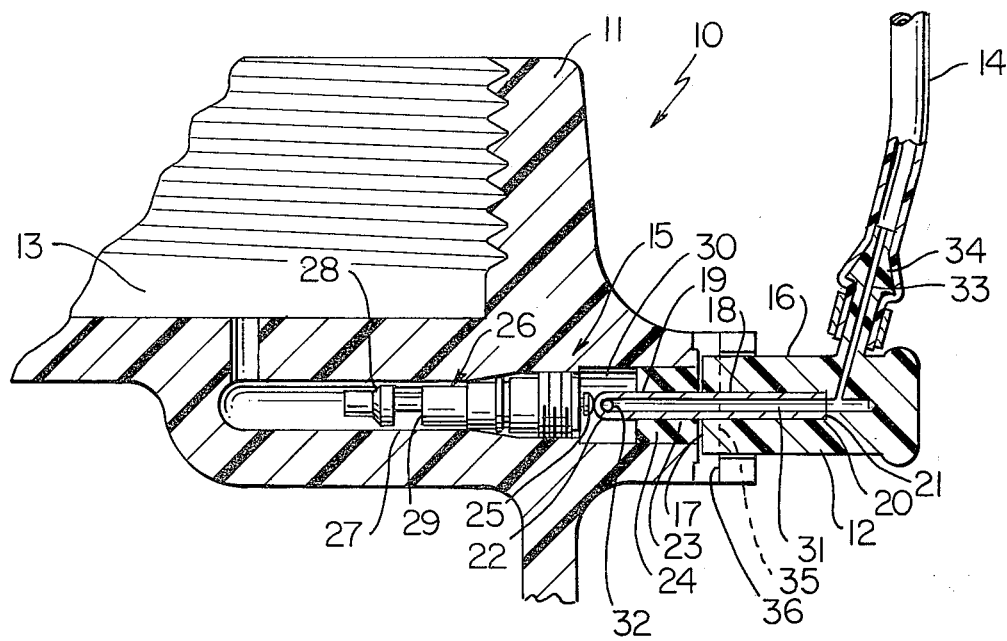
FIG. 1 is a fragmentary cross-sectional view of the prior art combination of an outlet coupling member detachably interconnected to the outlet means of a propellant storage construction.

While the various features of this invention are hereinafter described and illustrated as being particularly adapted to provide an outlet coupling member for a propellant storage construction wherein the propellant is gaseous $CO_2$ for carbonating beverages and the like, it is to be understood that the various features of this invention can be utilized singly or in any combination thereof to provide means for dispensing other types of propellants for other purposes as desired.

Therefore, this invention is not to be limited to only the embodiment illustrated in the drawings, because the drawings are merely utilized to illustrate one of the wide varieties of uses of this invention.

It is believed that in order to best understand the various features of this invention, a discussion of a prior known dispensing arrangement for a propellant, such as $CO_2$ for carbonating beverages, will be first described and the same is generally indicated by the reference numeral 10 in FIG. 1 and comprises a propellant storage construction 11 and an outlet coupling member 12 for receiving a gaseous propellant from a chamber 13 of the construction 11 to direct the same through a conduit means 14 to a desired location when the outlet coupling member 12 is fully inserted into the outlet means of the construction 11 that is generally indicated by the reference numeral 15 and as illustrated in FIG. 1.

The prior known arrangement 10 is fully disclosed in the aforementioned U.S. patent to Wilson et al, U.S. Pat. No. 3,762,431 and therefore, the U.S. patent to Wilson, U.S. Pat. No. 3,762,431 is being incorporated into this disclosure by this reference thereto in order to provide additional information concerning the details thereof that might be desired.

As illustrated in FIG. 1, the outlet coupling member 12 includes a body portion 16 having an end surface 17 interrupted by an opening 18 into which a needle-like member 19 is press fitted or otherwise secured in such a manner that one end 20 thereof bottoms out against an internal shoulder 21 of the body portion 16 and the other end 22 thereof projects beyond the end 17 of the body portion 16 a distance sufficient to be fully inserted through an opening 23 in a flexible sealing member 24 and engaged against an axially movable plunger 25 of a valve unit 26 that is disposed in an outlet passage 27 formed in the propellant storage construction 11 when the outlet coupling member 12 is fully inserted in the outlet means 15 in the condition illustrated in FIG. 1.

The plunger 25 of the valve unit 26 moves a movable valve member 28 away from a valve seat 29 when the plunger 25 is in its inward position as illustrated in FIG. 1 to permit propellant from the chamber 13 to flow through the outlet passage 27 and open valve unit 26 to the space 30 disposed between the valve unit 26 and the sealing member 23 to enter into an internal passage 31 of the needle-like member 19 through side opening means 32 in the end 22 of the needle-like member 19 to thereby flow through a passage 33 formed in a nipple extension 34 of the body portion 16 and into the conduit 14 which is telescoped on to the nipple portion 34 as illustrated.

The body portion 16 of the outlet coupling member 12 has a single wing-like interlocking tab 35 which interlocks with an interlocking surface means 36 of the construction 11 when the body portion 16 has been axially inserted to the position illustrated in FIG. 1 and rotated so as to dispose the wing 35 behind the interlocking surface 36.

Thus, it can be seen that when it is desired to operate the arrangement 10 to dispense propellant from the chamber 13 thereof to the desired area interconnected to the conduit 14, the operator merely takes the outlet coupling member 16 and inserts the needle-like member 19 thereof through the opening 23 in the sealing member 24 to cause the end 22 thereof to engage against the axially movable plunger 25 and open the valve seat 29 of the valve unit 26 as illustrated in FIG. 1. And by locking the wing-like member 35 in behind the locking surface 36, the coupling member 12 will remain in the position illustrated in FIG. 1 so that propellant from the chamber 13 can flow through the open valve unit 26, needle-like member 19, coupling member 12 and conduit 14 to the desired location.

However, as previously stated, because the sealing member 24 must be sufficiently flexible to provide for sealing against the needle-like member 19 when the same has been inserted through the opening 23 thereof, the sealing member 24 is not sufficiently effective in axially guiding the needle-like member 19 so as to be coaxially aligned with the plunger 25 so that any angularity between the plunger 25 and its needle-like member 19 during the insertion of the needle-like member 19 through the sealing member 24 causes the rounded end of the needle-like valve member 19 to slip off of the rounded end of the plunger 25 whereby the plunger 25 does not open the valve unit 26 even though the outlet coupling member 12 has been fully inserted into the outlet means 15.

Thus, it was found according to the teachings of this invention that an improved outlet coupling member could be provided which will not slip off of the plunger 25 of the valve unit 26 and would be more readily aligned in the outlet passage 27 for proper sealing therewith as will be apparent hereinafter.

In particular, the improved outlet coupling member of this invention is generally indicated by the reference numeral 12A in FIGS. 2–6 and is illustrated as being utilized in combination with a propellant storage construction 11A to provide an improved arrangement or combination that is generally indicated by the reference numeral 10A whereby parts of the outlet coupling member 12A and propellant storage construction 11A that are similar to parts of the coupling member 12 and construction 11 previously described are indicated by like reference numerals followed by the reference letter "A".

It can be seen that the propellant storage construction 11A is substantially identical to the propellant storage construction 11 previously described except that the outward end or cylindrical section 40 of the outlet passage 27A has a larger diameter and forms a mouth or frusto-conical section 41 that leads into the cylindrical section 40 as illustrated for a purpose hereinafter described, the frusto-conical section 41 terminating adjacent the locking surface means 36A.

The improved outlet coupling member 12A of this invention has a relatively long and substantially cylindrical body portion 16A that has an outer peripheral cylindrical surface 42 interrupted by an annular groove 43 intermediate the opposed ends 44 and 45 thereof. An annular resilient sealing member or O-ring 46 is disposed in the annular groove 43 and is of a size to project radially outwardly beyond the peripheral surface 42 of the body portion 16A so as to sealingly engage against the internal peripheral surface 47 of cylindrical section 40 of the passage means 27A when the body portion 16A is inserted into the cylindrical section 40 in the manner illustrated in FIG. 4, the mouth 41 of the construction guiding the outlet coupling member 12A into aligned relation with the section 40 during such insertion.

Figure 4:
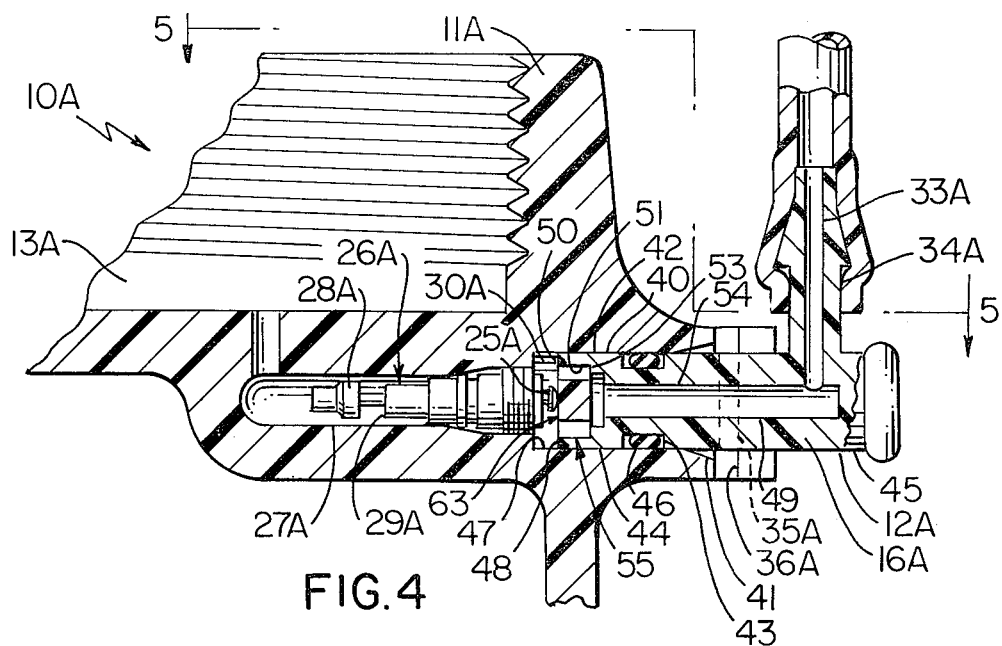
FIG. 4 is a view similar to FIG. 1 and illustrates the outlet coupling member of this invention of FIG. 2 in its interconnected position in the outlet means of the propellant storage construction of FIG. 2.

Because the outer peripheral surface 42 of the body portion 16A of the coupling member 12A is disposed closely adjacent the internal peripheral surface 47 of the passage section 40 as illustrated in FIG. 4, the surfaces 42 and 47 cooperate together to coaxially guide the body portion 16A into the section 40 so that the sealing member 46 is utilized solely for the purpose of sealing to the peripheral surface 47 of the passage section 40 outboard of the valve unit 26A so as to cooperate therewith to define the chamber 30A for feeding propellant dispensed through the valve unit 26A to the outlet coupling member 12A.

The body portion 16A of the outlet coupling member 12A has a transverse end or flat end surface 48 at the end 44 thereof interrupted by a stepped bore or passage 49 that causes the end surface 48 to define a substantially annular flat surface 50.

The stepped passage or bore 49 in the body portion 16A has the largest cylindrical section 51 thereof disposed adjacent the annular end surface 50 with the next largest cylindrical section 52 cooperating therewith to define an annular shoulder 53 inside the body portion 16A, the smallest cylindrical section 54 of the passage 49 leading to the passage 33A in the nipple 34A as illustrated in FIG. 4.

Figure 3:
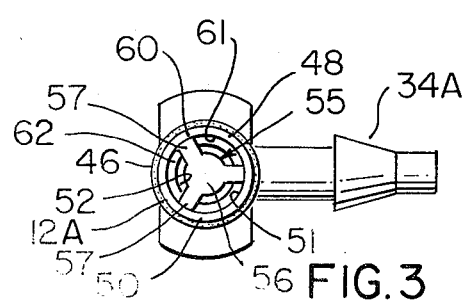
FIG. 3 is an end view of the outlet coupling member of FIG. 2 and is taken in the direction of the arrows 3—3 of FIG. 2.

A star-like member is provided for the outlet coupling member 12A and is generally indicated by the reference numeral 55, the star-like member 55 having a substantially cylindrical central portion 56 and a plurality of circumferentially and equally spaced and radially outwardly extending substantially rectangular points 57 press-fittingly disposed into the section 51 of the passage 49 in the outlet coupling member 12A until one flat side 58 of the star-like member 55 is disposed against the shoulder 53 at the outer portion of the points 57 thereof while the other opposed flat side 59 thereof is disposed substantially coplanar with the annular end surface 50 as illustrated. The points 57 have arcuate outer end surfaces 60 that press-fittingly engage against the internal peripheral surface 61 of the passage section 51 as illustrated in FIG. 3 whereby a plurality of openings 62 are respectively defined between the points 57 and are disposed in a circular array adapted to be disposed concentric and outboard of the plunger 25A of the valve unit 26A when the outlet coupling member 12A is fully disposed in the passage section 40 as illustrated in FIG. 4. In this manner, the substantially flat surface 59 of the central part 56 of the star-like member 55 engages against the plunger 25A to move the same inwardly to open the valve unit 26A as illustrated in FIG. 4 without having any tilting effect of the outlet coupling member 12A as is provided by the outlet coupling member 12 previously described.

In this manner, it is always assured that the valve plunger 25A will move the valve member 28A of the valve unit 26A to its open condition as illustrated in FIG. 4 each time the coupling member 12A is inserted into the outlet section 40 because the long cylindrical surface 42 of the body portion 16A is axially guided by the relatively long internal cylindrical peripheral surface 47 of the construction 11A so that the flat end surface 59 of the central portion 56 of the star-like member 55 will be properly aligned to engage the plunger 25A with the openings 62 being disposed a sufficient distance outboard of the plunger 25A so that the plunger 25A cannot slip into any one of the openings 62.

Therefore, it can be seen that the flat surface 59 of the star-like member 55 and the coplanar flat annular surface 50 of the body portion 16A of the outlet coupling member 12A define a substantially flat end surface means that is generally indicated by the reference numeral 63.

Figure 2:
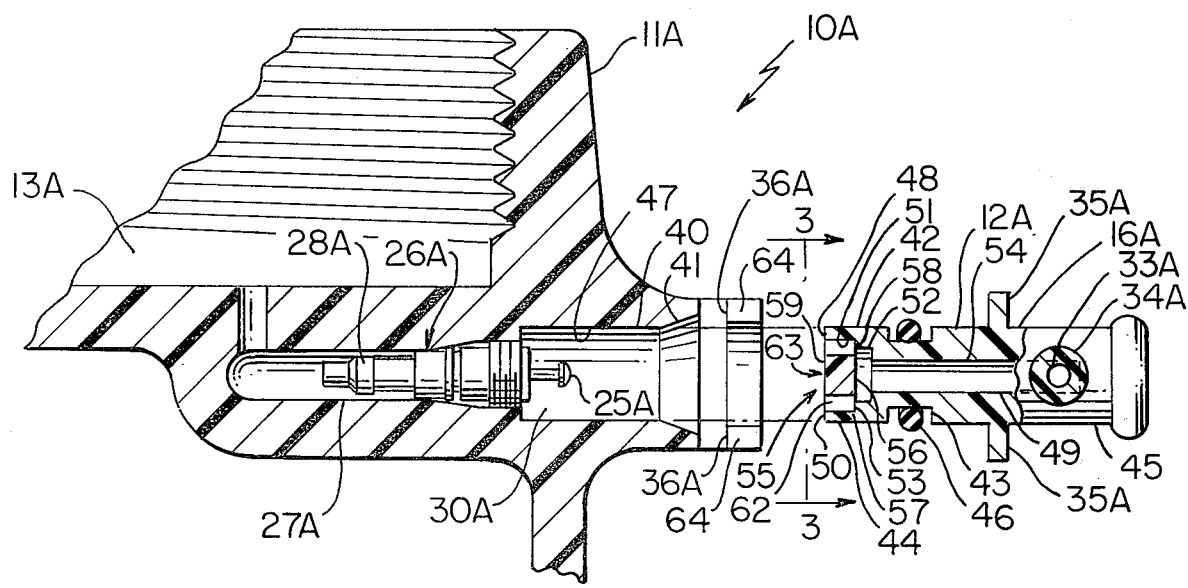
FIG. 2 is a view similar to FIG. 1 and illustrates the improved combination of this invention wherein an improved outlet coupling member of this invention is disposed in a position for inserting into the outlet means of the propellant storage construction.

As fully illustrated in FIG. 2, it can be seen that the section 52 of the passage 49 in the outlet coupling member 12A is of a sufficient diameter to be disposed in fluid communication with the openings 62 as the diameter of the section 52 is greater than the diameter of the central section 56 of the star-like member 55 whereby the propellant passing out of the opened valve unit 26A can pass into the openings 62 of the section 51 and from the section 51 into the section 52 between the points 57 and central section 56 of the star-like member 55 to thereby pass into the passage section 54 and out through the nipple 34A.

Figure 5:
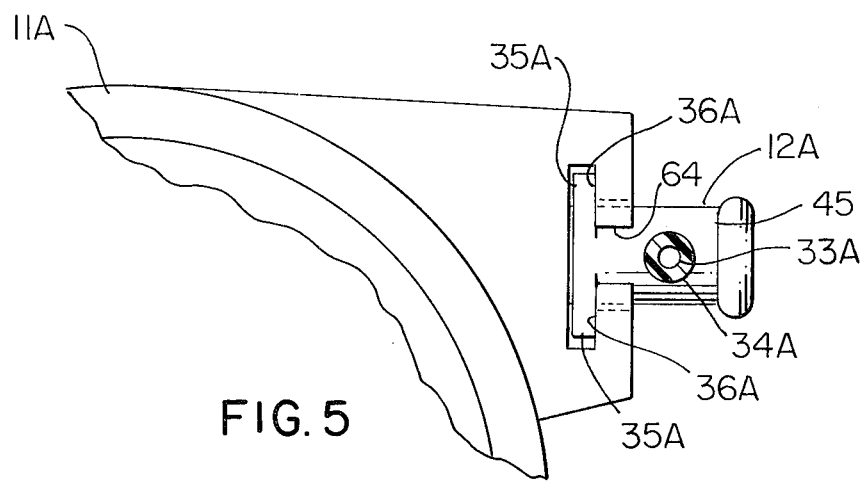
FIG. 5 is a fragmentary cross-sectional view taken on line 5—5 of FIG. 4.
Figure 6:
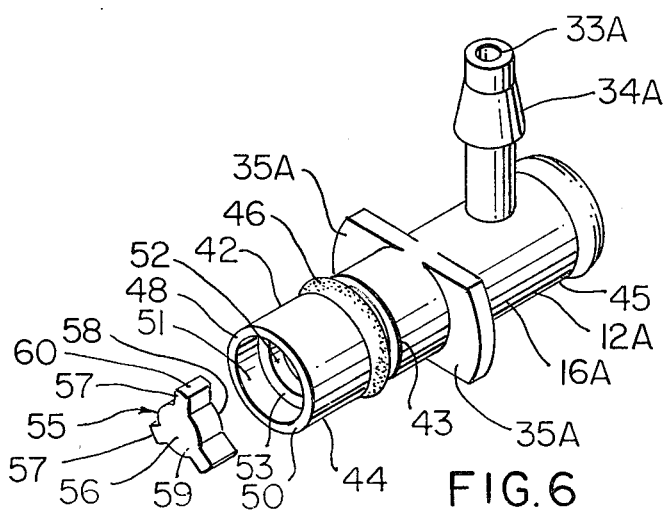
FIG. 6 is an exploded perspective view of the improved outlet coupling member of this invention.

The body portion 16A of the outlet coupling member 12A is provided with a pair of opposed wing-like interlocking members 35A which respectively cooperate with the interlocking surface means 36A of the propellant storage construction 11A as illustrated in FIG. 5 so as to prevent any attempt to cock the body portion 16A in the opening 40 of the construction 11A after the same has been fully inserted therein and been locked in place.

Therefore, it can be seen that the outlet coupling member 12A of this invention can be formed in a relatively simple manner by the method of this invention to operate in a manner now to be described.

As long as the outlet coupling member 12A is in the out condition as illustrated in FIG. 2, the valve unit 26A is in its closed position to prevent propellant from the chamber 13A from passing through the valve unit 12A to the outlet end 40 of the passage 27A.

However, when it is desired to dispense propellant from the propellant storage construction 11A, the outlet coupling member 12A is inserted into the opening 40 while in the rotational position illustrated in FIG. 2 so that the wing-like interlocking members 35A thereof align with suitable slots 64 of the construction 11A to permit the body portion 16A to be fully inserted into the cylindrical section 40 of the passage 27A so that the substantially flat end surface means 63 of the body portion 16A will engage against the plunger 25A and axially move the same inwardly to the position illustrated in FIG. 4 to fully open the valve member 28A away from the valve seat 29A, the O-ring sealing member 46 fully sealing with the internal peripheral surface 47 of the construction 11A before the plunger 25A opens the valve seat 29A so that any propellant passing out of the valve unit 26A as the plunger 25A is being axially moved to its fully open position will be sealed in the resulting chamber 30A to only exit therefrom out through the opening means 62 in the end surface means 63 of the outlet coupling member 12A.

Once the body portion 16A of the outlet coupling member 12A has been fully axially inserted in the outlet section 40 in the manner illustrated in FIG. 4, the body portion 16A is rotated 90° as illustrated in FIG. 4 to cause the wing-like members 35A thereof to interlock behind the surface means 36A of the construction 11A whereby the outlet coupling member 12A holds the valve unit 26A in its fully open position so that propellant from the chamber 13A will pass through the open valve unit 26A and into the opening means 62 in the end surface means 63 of the body portion 16A of the outlet coupling member 12A and to the conduit 14A through the nipple 34A as illustrated. Thus, propellant will be supplied by the conduit means 14A for any desired purposes, such as for carbonating a beverage or the like.

Should it be desired to disconnect the outlet coupling member 12A from the construction 11A, the body portion 16A is merely rotated 90° from the position illustrated in FIG. 4 to the position illustrated in FIG. 2 so that the wing-like members 35A will clear from behind the surface means 36A of the construction 11A to be axially moved out through the slots 64 as the body portion 16A is axially moved outwardly from the cylindrical section 40 of the passage 27A, the plunger 25A fully moving to its closed position as illustrated in FIG. 2 before the O-ring sealing member 46 clears the peripheral surface 47 of the cylindrical section 40 of the passage 27A and enters the frusto-conical section 41 as illustrated.

Therefore, it can be seen that this invention not only provides an improved outlet coupling member for a propellant storage construction and method of making such an outlet coupling member, but also this invention provides an improved combination of a propellant storage construction and an outlet coupling member therefor.

While the forms and methods of this invention now preferred have been illustrated and described as required by the Patent Statute, it is to be understood that other forms and method steps can be utilized and still fall within the scope of the appended claims.

What is claimed is:

1. In the combination of a propellant storage construction and an outlet coupling member detachably interconnected to an outlet means of said construction for dispensing propellant from said construction, said outlet means comprising a locking surface means and an outlet passage in said construction and having a valve unit therein that requires a plunger thereof to be axially moved inwardly in said unit to open said unit so that propellant can be dispensed through said outlet passage to said outlet coupling member when said outlet coupling member is disposed in said outlet passage and engages and holds said plunger in its inward position while having interlocking means thereof interlocked with said locking surface means, the improvement wherein said outlet passage has a substantially cylindrical section and a frusto-conical mouth-like section intermediate said cylindrical section and said locking surface means, said outlet coupling member having a substantially flat end surface means spanning said outlet passage and engaging said plunger, said end surface means having opening means therein disposed outboard of said plunger for receiving said propellant that passes through said open valve unit, said outlet coupling member having a substantially cylindrical body portion provided with opposed ends and an annular groove intermediate said opposed ends thereof, one of said opposed ends of said body portion defining said end surface means, said body portion carrying an annular sealing ring in said annular groove, said sealing ring sealing with said outlet passage outboard of said valve unit.

2. A combination as set forth in claim 1 wherein said opening means of said end surface means of said outlet coupling member comprise a plurality of spaced apart openings in said end surface means.

3. A combination as set forth in claim 2 wherein said openings in said end surface means of said outlet coupling member are disposed in a circular array that is substantially concentrically disposed relative to said plunger.

4. A combination as set forth in claim 3 wherein said end surface means of said outlet coupling member comprises an outer annular portion and an inner star-like portion having a central section and a plurality of points radially extending from said section to said annular portion whereby said openings are defined between said points and between said annular portion and said central section of said star-like portion.

5. A combination as set forth in claim 4 wherein one of said opposed ends of said body portion is interrupted by a stepped passage whereby said stepped passage defines said annular portion at said one end of said body portion, said star-like portion being separate from said body portion and being disposed in said stepped passage.

6. A combination as set forth in claim 1 wherein said frusto-conical section has opposed large and small bases, said small base being adjacent said cylindrical section and having the same diameter as said cylindrical section, said large base being adjacent said locking surface means.

7. A combination as set forth in claim 1 wherein said interlocking means of said body portion of said coupling member comprises a pair of outwardly directed wing-like parts.

8. A combination as set forth in claim 7 wherein said wing-like parts of said body portion of said outlet coupling member extend in opposite directions from said body portion.

* * * * *